Inventors
Peter M. Henkes
Fred Steinbrecker
By Beek & Beck
Attorneys

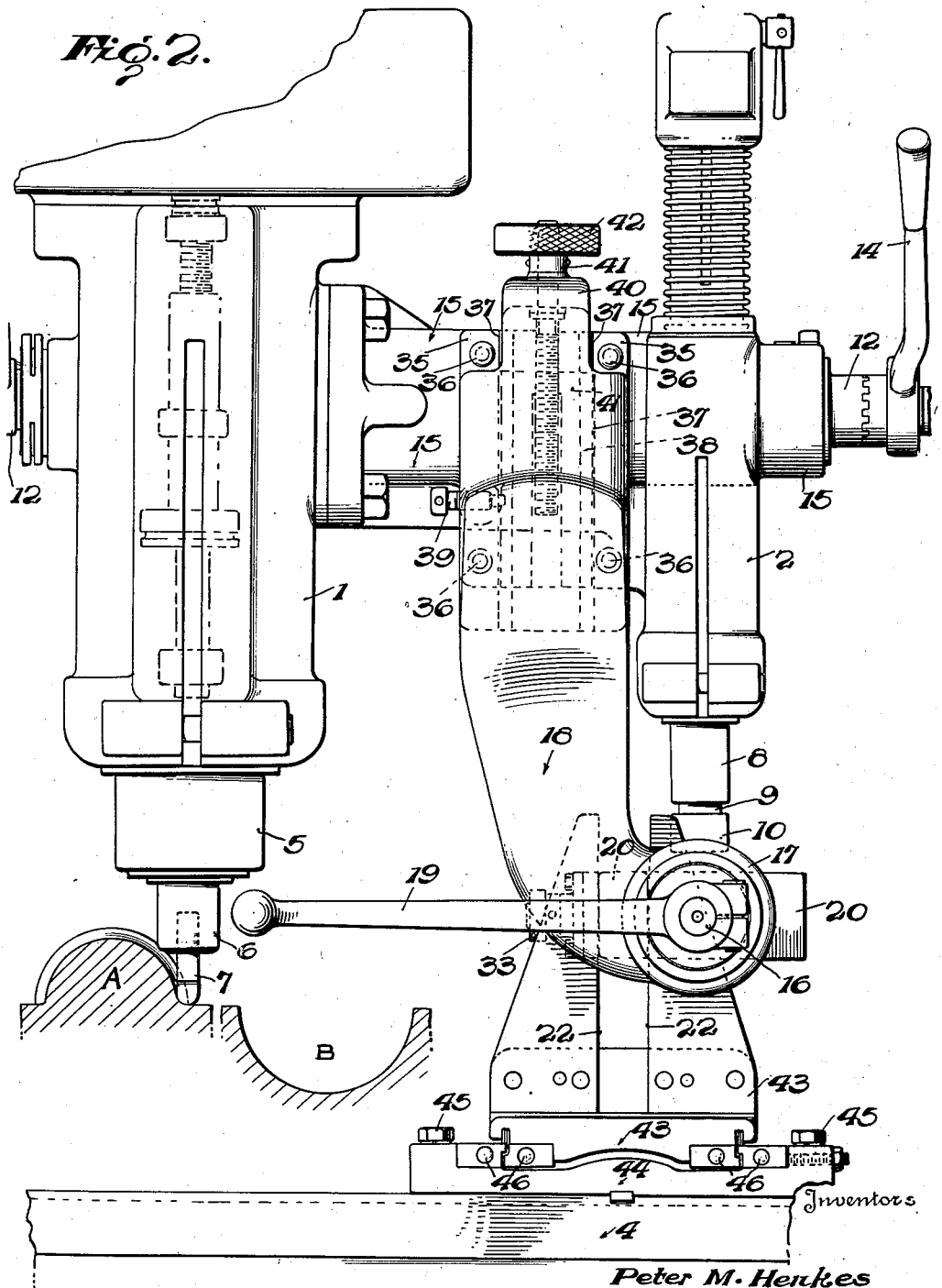

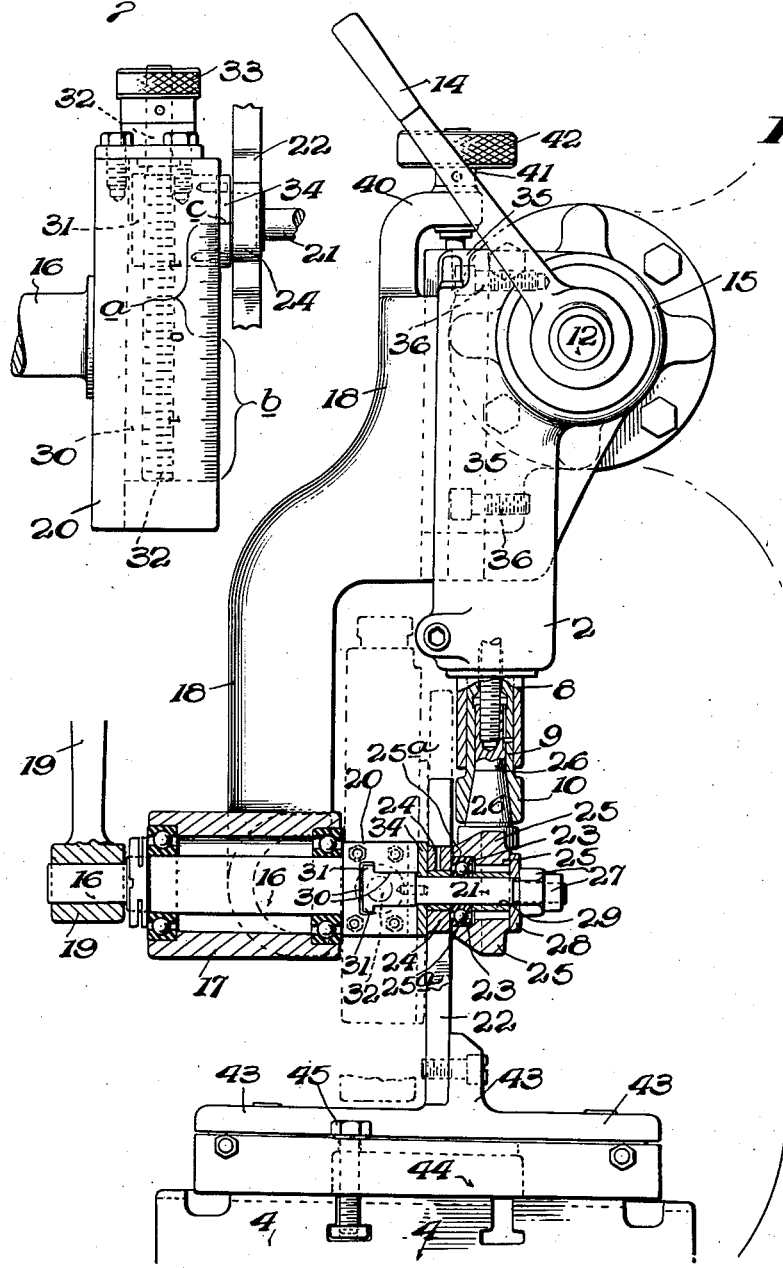

Patented May 13, 1941

2,242,123

UNITED STATES PATENT OFFICE 2,242,123

MACHINE TOOL ADAPTED FOR THE PRODUCTION OF CHERRYING CUTS OR SUBSTANTIALLY SIMILAR WORK

Peter M. Henkes and Fred Steinbrecker, Racine, Wis., assignors, by mesne assignments, to George Gorton Machine Co., Racine, Wis., a corporation of Wisconsin Application January 26, 1939, Serial No. 252,966

21 Claims. (Cl. 90—11)

This machine relates to machine tools adapted for the production of "cherrying" cuts or substantially similar work; and the objects and nature of the invention will be apparent to those skilled in the art in the light of the following explanations of the accompanying drawings that illustrate a mechanical expression or embodiment of the invention from among other organizations and modifications within the spirit and scope of this invention.

An object of the invention is to provide routing, milling, die sinking, or other machine tool organizations with comparatively simple accurate and improved mechanism for the production of so-called cherrying cuts and work or substantially like work in a vertical plane, that is mechanism capable of producing semi-cylindrical depressions and elevations in a vertical plane, or work of substantially such characteristics.

And a further object of the invention is the provision of an improved organization for, say, temporary, attachment to a machine tool, say of the die sinking, milling, routing or duplicating type, to render such machine capable of making vertical cherrying cuts in the production of work having substantially curved depressions or elevations, or the like of a predetermined radius.

A further object of the invention is to provide a milling or other machine tool wherein the vertical cutter means and the work holder or table means are relatively straight-line movable vertically for vertical depth cutting, and wherein one of said means is normally held against lateral movements and the other of said means is relatively straight-line movable laterally for lateral cutting, with a comparatively simple attachment capable of cooperative association with said machine tool to control and coordinate said relative straight-line vertical movements between said cutting and work holding means, with said relative straight-line lateral movements between said cutting and work holding means, to produce in the work elevations or depressions of a predetermined radius, and to render said attachment capable of operation either manually or by power, and capable of adjustment and setting to produce in the work cherrying or substantially like vertical cuts of any predetermined radius, within the capacity of the attachment.

And another object of the invention, from a specific standpoint, is to provide a machine tool or the like, having a rotary milling, routing or other cutter spindle normally held against lateral movement and confined to straight-line vertical longitudinal movements, and a work holder normally movable in a straight line substantially perpendicular to the longitudinal axial line of said cutter spindle, with a so-called cherrying organization operatively-associated with said cutter spindle and with said work holder, to simultaneously control and coordinate the vertical movements of the cutter spindle and the lateral movements of the work, for the production of semi-cylindrical surfaces or substantially like work in a vertical plane, in or on the work either in depression or elevation, with said organization capable of selective adjustment and setting to produce such surfaces of any radius within the capacity of the organization.

With the foregoing objects in view, and others developed by the following explanations, this invention consists in certain novel features in organization, structures and arrangements, and in combinations and sub-combinations, as hereinafter more fully explained and specified by the following claims.

Referring to the accompanying drawings, forming a part hereof:

Fig. 2 is a front view partly in section and partially broken away showing the cutter and tracer heads on the connecting housing, with the cherrying mechanism at either the starting or completion of a cherrying cut, several pieces of work being shown in section to illustrate examples of convex and concave surfaces cut therein.

Fig. 3 more or less diagrammatically shows a vertical section through certain portions of the cherrying mechanism, illustrating the tracer head and the cherrying mechanism supporting frame in side elevation.

Fig. 4 is a detailed top plan view of the double crank or cross head of the cherrying mechanism, the crank pin and rock shaft thereof being indicated in top plan, with parts broken away.

Figure 1:
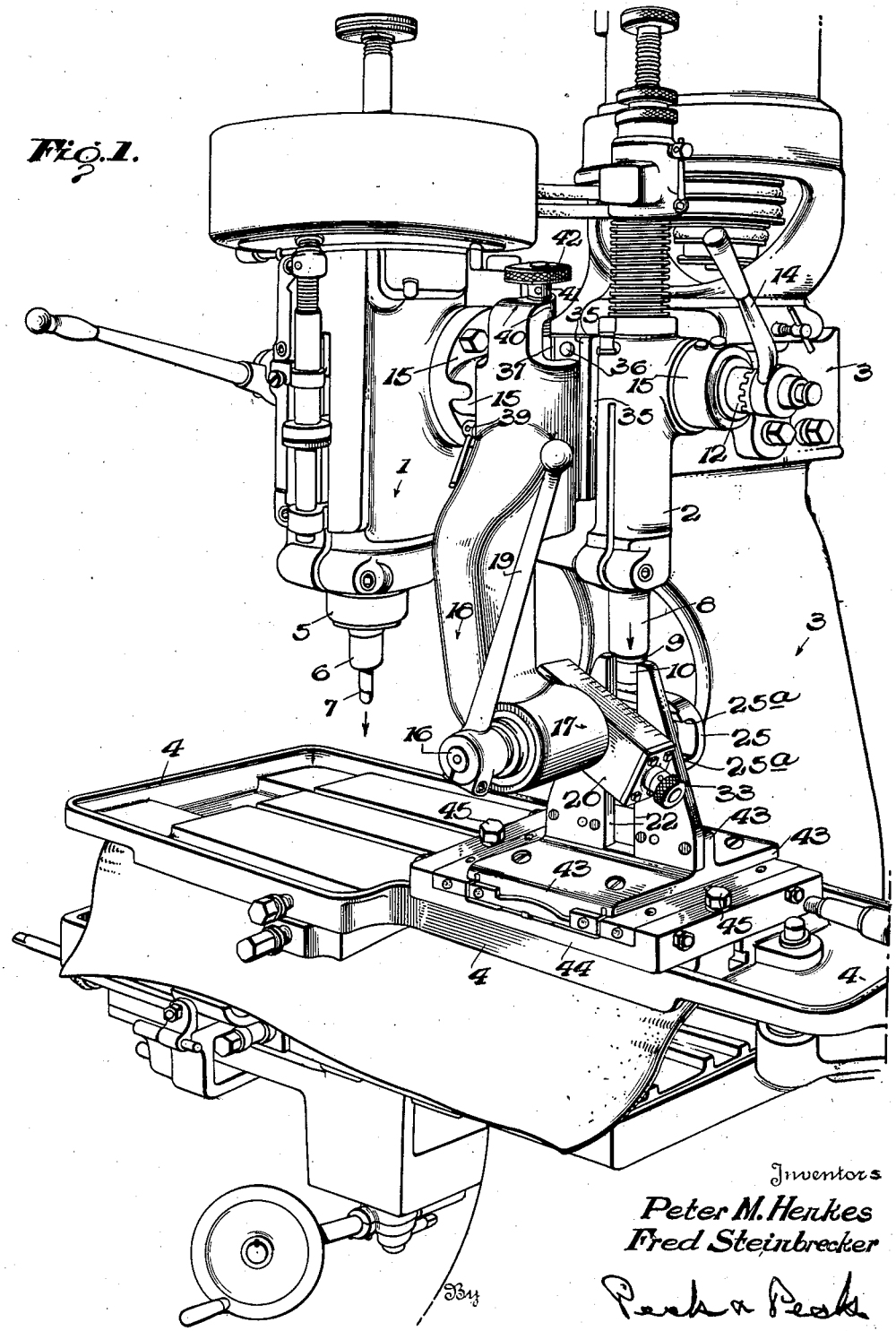
Fig. 1 is a perspective view showing in part an example of a machine tool of the instant invention, the cherrying mechanism being shown in an intermediate position between the starting and completion of a cherrying cut.
Figure 5:
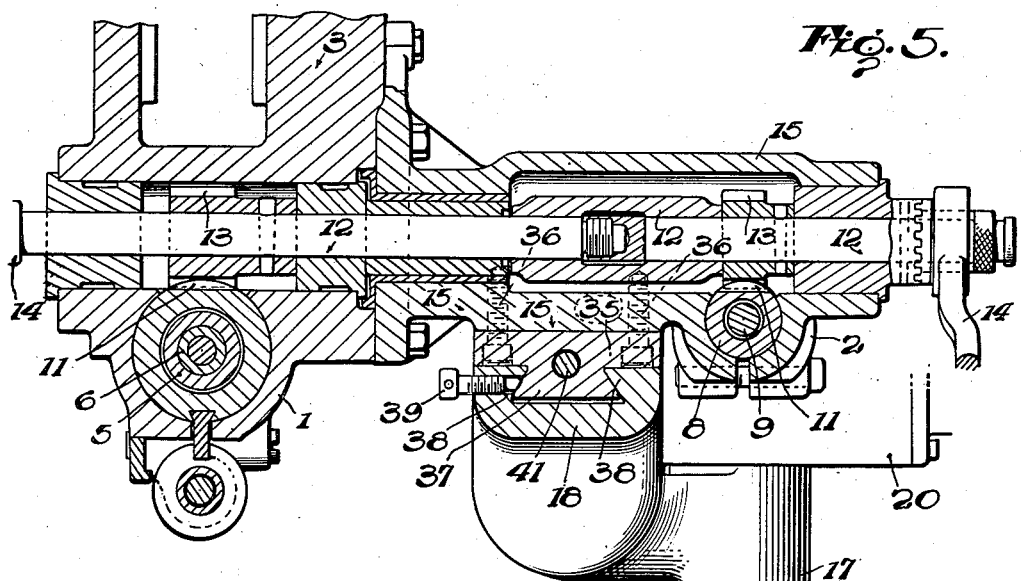

Fig. 5 is a horizontal section through the cutter and tracer heads and the housing connecting the same, the section being taken in approximately the horizontal plane of the rock shaft that is geared to both the cutter spindle barrel and the tracer spindle barrel.

Figure 6:
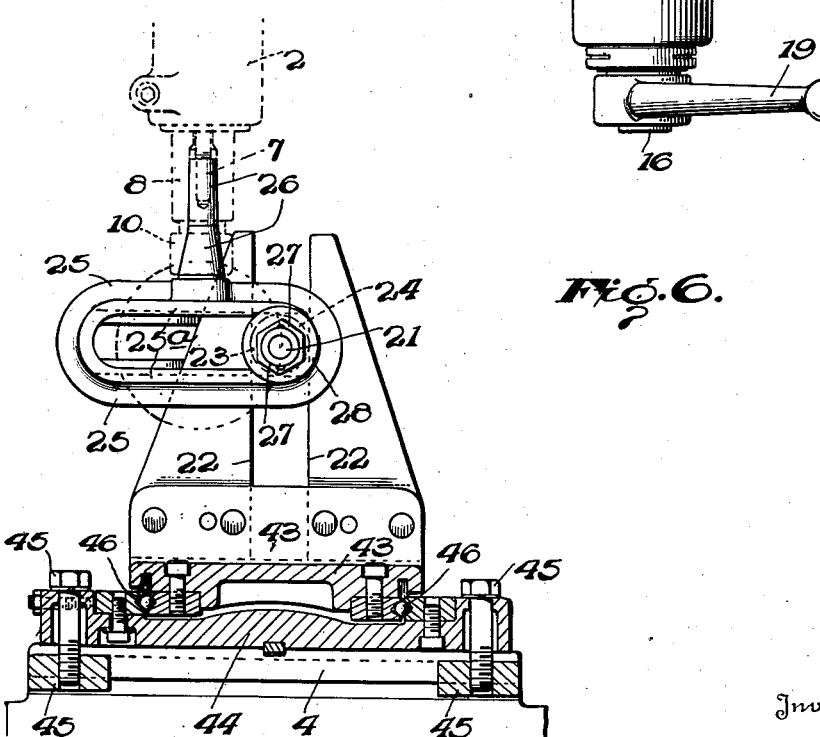

Fig. 6 is a transverse vertical section through the work table and the mounting thereon for the vertical spaced rails, showing in side elevation the yoke and crank pin connection with the tracer spindle barrel.

The drawings illustrate an example embodiment of the instant invention applied to, assembled with or included in, the machine tool of the duplicator type disclosed by U. S. Patent No. 2,005,696, issued June 18, 1935, to George Gorton Machine Co., Racine, Wisconsin, merely, as one example of a routing, milling, die-sinking, or machine tool type, from among others, in or with which this invention can be operatively associated by either being built therein as a more or less permanent part thereof, or to which the invention can be temporarily applied as an attachment, to enter into operative combination and association therewith as an operative part thereof.

This example duplicating machine tool of said patent to which reference is made for complete disclosure, for normal duplicating operations, provides an overhanging vertical cutter head 1, and an overhanging vertical stylus or tracer vertical head 2, with these two heads laterally spaced apart and normally fixedly supported by the machine frame column 3, or parts rigid therewith, and also normally held in fixed lateral relation against normal relative lateral movements. A horizontal table 4 is arranged below said two heads, and for normal duplicating work, the pattern or copy is fixed on said table below the tracer head, and the work in which the copy is to be duplicated, is fixed on the table below the cutter head. This table 4 is carried by any suitable milling or other machine knee that is vertically adjustable on the machine frame, as by feed screw and nut means provided with a rotary adjusting wheel, as usual or otherwise.

The vertically adjustable knee, as disclosed in said patent, carries any suitable conventional or other machine tool work table having screw threaded or other feed means and rotary operating handle, for straight-line longitudinal movement of said ordinary work table. This ordinary work table is, in the patent, mounted for straight-line longitudinal feeding on a conventional supplemental table or saddle that is capable of straight-line lateral movement to bodily feed said ordinary work table laterally, and is provided with any suitable lateral feed means and its rotary operating handle, as common in the art, or otherwise.

The particular sensitive table 4, shown in the patent, is also provided with other mountings, carried by and mounted on said ordinary work table, that render said table 4 more or less freely and independently universally movable laterally in a normally-fixed horizontal plane, under manual control and action, to hold the tracer and the cutter to the copy and the work during a cutting operation.

Said mounting for said table 4, that is normally universally laterally movable, shown by said patent, includes a base removably fixed on said ordinary work table, a saddle mounted on said base and confined thereto for straight-line in and out or transverse movements and against relative vertical movement, and the table 4, mounted on and confined to said last named saddle against relative vertical movement and confined to relative straight-line longitudinal movements. Where it is desired to confine table 4 to a straight-line longitudinal movement only, the last named saddle is clamped to its base against relative lateral movements, and the lateral feed for the ordinary work table is depended on to feed table 4, laterally after each cut is made, as hereinafter described.

A vertical quill or slide-barrel 5 is longitudinally slidable in and carried by the vertical fixed shell or housing of the cutter head 1, and the rotary driven spindle 6, for the rotary milling or other suitable cutter 7, is rotatably mounted in said barrel 5, and depends therefrom. The barrel 5, and its rotary spindle 6 are normally held against relative lateral movements and hence are normally confined to longitudinal straight line movements by the cutter head.

A vertical slide-barrel 8 is likewise slidable and confined to straight line vertical movement in and carried by the normally-fixed vertical shell or housing of the tracer head 2, and barrel 8, carries the longitudinal tracer spindle 9, against normal relative lateral movements, and the lower end of spindle 9, depending from head 2, and barrel 8, is equipped with any suitable collet or chuck 10, to replaceably receive and lock a tracer or a piece having a corresponding shank.

In said machine of the patent, for normal duplicating operations, the cutter slide-barrel 5, and the tracer slide-barrel 8, are correspondingly and simultaneously movable vertically and held at any desired vertical positions by suitable manually actuated and control means. For instance, each barrel at its rear side, is provided with a longitudinal toothed rack 11, and a transverse rock shaft 12 carries gears or pinions 13, normally fixed thereto and in mesh with the racks 11, respectively, and is provided with an exposed crank handle 14, applied to either shaft end, whereby the shaft can be manually rocked to simultaneously raise or lower said barrels. The rock shaft 12 extends through and is mounted in the housings or shells of the heads 1, 2, and extends longitudinally through a normally fixed rigid tubular housing 15, normally rigid with and joining the two spaced heads 1, 2.

In this example machine tool, for normal operations of duplicating the copy on or in the work, the relatively laterally fixed cutter and the tracer are manually held down to vertical operative association with the work and the copy, respectively, by means of a crank handle 14, and said rock shaft and gearing, while the operative lateral association of the cutter and work and the tracer and copy are manually maintained through the universally laterally movable table 4, normally maintained in a fixed horizontal plane.

To adapt such duplicating apparatus for use in making cherrying cuts in the production of work having semi-cylindrical surfaces, either concaved or convexed, without employing a copy and tracer, we have devised means for actuating and controlling the vertical movements of the cutter to produce the completed cherrying cut, through the medium of the tracer slide barrel and the rock shaft and gearing operatively coupling together said tracer slide barrel and the cutter spindle slide barrel, and to automatically, simultaneously, and correspondingly longitudinally advance the table 4, throughout the full diameter of the particular cherrying cut being produced. Such means, is adjustable to produce cherrying cuts of any desired radius within the capacity of the particular organization, and is preferably manually actuated and controlled, particularly where heavy cuts with comparatively large size cutters are not required.

The straight-line vertical feeding movement of the cutter throughout the cherrying cut is constantly coordinated with the corresponding straight-line horizontal advance of the work throughout the full width or length of the cut longitudinally of the table.

The foregoing adaptation of our said means is to a milling organization wherein the lateral or horizontal movement for the full width of the cherrying cut, is accounted for by relative lateral movements between the cutter and the work. Our said means is also readily adaptable to a milling organization wherein the work is normally stationary and both the vertical and lateral movements for the full width of the cut are attained by coordinated corresponding vertical and lateral movements of the cutter, or by such vertical and lateral movements of the work where the cutter is held against vertical and lateral movements. Also, our said means can be readily adapted to a milling or other machine tool, having a vertically feedable cutter spindle normally fixed against lateral movement, and a work table capable of free straight-line horizontal movement, by operatively coupling my manually actuated means directly to the table for feeding the same, and also directly to the cutter spindle feed or to the cutter spindle barrel, where the machine does not employ a tracer carrier or a tracer carrier geared to the cutter spindle carrier, all to produce the required vertical feed of the cutter and the simultaneous coordinated feed of the table throughout the cherrying cut.

In the specific embodiment illustrated as one example from among others, of such means for simultaneously producing the coordinated straight-line relative lateral movements between the cutter and work, and the straight-line relative vertical movements between the work and the cutter, throughout the complete cherrying cut, we preferably employ controlled rotary or crank actuating means, the operative radius of which can be adjusted and set at any desired length within the capacity of the particular organization, to predetermine the radius of the cherrying cut and the width of such cut, i. e. the full length of the relative lateral movements between the cutter and work, with mechanisms to change the rotary motion of said crank means into rectilinear or linear relative lateral feeding movements between the cutter and work, and into simultaneous coordinated linear relative vertical feeding movements between the cutter and work.

For instance, where our invention is adapted to the particular machine tool type illustrated, without intending to so limit our invention, we prefer to employ a single actuating member, for instance, crank arm 19, for propelling the machine parts that carry out said straight line movements necessary to produce the cherrying cuts where heavy cuts with large cutters are not required. In this particular example, without desiring to so limit all features of our invention, this crank arm 19 constitutes a manually-actuated and controlled handle, vertically swingable on a normally-fixed center throughout an arc of substantially one hundred and eighty degrees or throughout a full circle where possible or desirable. This actuating and control handle 19 is in this example, accessibly arranged at the front of the machine, to move freely in a vertical plane clear of table 4, throughout a full circle, if so desired. This handle 19 is normally fixed to a horizontal axis or rock shaft 16, in this instance, arranged transversely with respect to the longitudinal axis of work table 4, and mounted to rotate in and carried by a bearing hub 17, normally fixedly located with respect to and carried by a supporting frame, arm or bracket 18, normally fixedly located and carried by a fixed part of the machine organization. For instance, in this example, the supporting arm 18 is normally fixed to and depends from the fixed housing part 15, between the cutter head 1, and the tracer head 2, with the hub 17, handle 19, and rock shaft 16, arranged above the table 4, and substantially below the tracer head 2, the tracer having been previously removed from the chuck or collet 10, of the tracer spindle 9, preparatory to the adaptation of the machine for making cherrying cuts.

Said rock shaft impelled by the handle 19 is, in this example, provided with crank means cooperatively associated with the table 4, for converting the rotary motion of said shaft into advancing straight-line movement of said table, and with crank means associated with the tracer slide barrel 8, for converting the rotary motion of the rock shaft into vertical straight-line movement of barrel 8, and consequently of the cutter spindle barrel 5, and the milling or other cutter 7, with the feeding movements of the table (work) and of the cutter coordinated and simultaneous, to attain the cherrying cut of the radius for which the organization is adjusted and set. For instance, in this particular example, the rock shaft 16 is provided with crank 20, normally rigid therewith, and, in this example, located at the inner end thereof beyond the inner end of hub 17, in which said shaft is mounted. This crank 20 is preferably in the form of a straight cross or T head forming in effect, two oppositely projecting longitudinally alined crank arms projecting radially from the longitudinal axis of the shaft.

This crank 20 is provided with a preferably straight crank pin 21, normally rigid therewith and projecting inwardly therefrom with its longitudinal axis parallel with the longitudinal axis of the rock shaft, when adjusted and set longitudinally of the crank 20, to predetermine the radius of the cherrying cuts. In this example, said eccentrically arranged crank pin 21 is operatively associated with the work table 4, to feed the same longitudinally in a straight line in either direction, through the medium of suitable means. For example, we show a pair of tracks or rails 22, upstanding from and normally rigid with the table 4, and providing a pair of parallel straight-elongated vertical rigid track-forming edges spaced apart to operatively receive a vertically movable slide block 24, located therebetween, with a sufficiently close fit, to prevent objectionable lost motion, and permit free vertical movement of said block longitudinally of said rails in propelling the table longitudinally in either direction according to the direction of rotation of the rock shaft. The crank pin 21 extends through and is mounted to rotate in said block 24.

The straight crank pin 21 is, in this example, extended inwardly beyond the upright rails 22, and said block 24, and suitable means are provided associated with said pin and the tracer slide barrel 8, to convert the rotary movement of the pin around the axis of rock shaft 16, into rectilinear or vertical movement of said barrel 8, coordinated and simultaneously with the advancing movement of table 4.

For instance, we show a roller 23, concentrically mounted on crank pin 21, preferably through the medium of ball bearings, and located at the inner side of the slide block 24. The crank pin 21 extends laterally from slide block 24, transversely through, a vertically disposed horizontally elongated yoke 25, provided with a central top upstanding shank 26, rigid therewith, with its axis perpendicular to the longitudinal axis of the yoke, and this shank is complementary to the collet or chuck 10, depending from the tracer spindle 9. When the tracer is removed from said chuck, the shank 26 is adapted to fit and be locked in said chuck (by the means employed to lock the tracer), with the yoke 25, depending from the chuck and arranged longitudinally with respect to table 4.

The yoke 25 provides a longitudinal opening closed at its ends, with vertically spaced upper and lower parallel horizontal tracks 25a, on the upper one of which roller 23, longitudinally travels as the crank pin 21 moves upwardly along its arcuate path, to elevate tracer slide barrel 8, and on the lower one of said tracks 25a, said roller travels as the crank pin moves downwardly on its arcuate path, to depress the barrel 8. The crank pin 21 extends through and beyond the yoke 25, and the yoke can be more or less loosely confined thereto by any suitable means, although for this purpose we happen to show nuts 27, screwed on the threaded free end of said pin against washer 28, fitting the rear face of the yoke 25, and holding bushing 29, in place against the ball bearing for roller 23.

As the eccentricity of the crank pin 21, or its radial distance from the axis of rock shaft 16, remains the same, at its point of operative association with the rails 22, and also at its point of operative association with the tracks 25a, of yoke 25, swinging movement of lever or crank 19 produces coordinated and simultaneous lateral feeding of the work and vertical feeding of the cutter, throughout the full cherrying cut, all under the stopping, and starting and speed control of the operator through the hand lever 19.

Any suitable means can be provided for adjusting and setting the crank pin 21, longitudinally of the crank 20, at the desired radial distance from the axis of rock shaft 16, to produce cherrying cuts of any desired radius within the capacity of the organization.

For instance, in the particular example illustrated, the cross head or double crank 20, rigid with rock shaft 16, is formed with an internal longitudinal slideway providing a longitudinal slot opening through the inner or rear longitudinal side face of the cross head. If so desired this slideway and slot can be formed by longitudinal T-groove or an undercut groove 30, normally closed at the ends of the cross head.

The crank pin 21 is confined in the slot or slideway of the cross head against relative endwise movement of said pin, but in such manner as to permit bodily adjustment of the pin longitudinally of the cross head and locking of the pin in any position to which adjusted longitudinally of the cross head. We happen to show the inner end of the crank pin 21 enlarged or T-shaped to form slide block 31, in the T-groove 30, with the body or shank of the crank pin extending rearwardly beyond the slideway and cross head. As an example of means that can be employed for shifting the crank pin longitudinally of the cross head 20, and holding the same in the adjusted position, we happen to show the slide block 31 of the crank pin perforated to form a non-rotary nut threaded on the longitudinally threaded rotary adjusting screw 32, extending longitudinally through and beyond an end of the cross head 20, and mounted in said cross head against normal relative longitudinal movement. This screw 32 is provided with an exterior accessible hand or finger wheel 33, whereby the same can be rotated in either direction for adjusting the crank pin to set the same at the desired degree of eccentricity to predetermine the radius of the cherrying cuts.

A visually exposed longitudinal side face of the cross head 20, here shown as the upper side face thereof, is provided with a visible radius length indicating scale *a*, beginning at zero located in the vertical plane in which the longitudinal axis of rock shaft 16 is located, and progressively increasing in radius length indications toward one end of the cross head, for use when the crank pin is adjusted for convex cherrying cuts. Said side face of the cross head is also provided with a similar visual radius length indicating scale *b*, that also begins at said zero mark, but progressively increases in radius length indications toward the opposite end of the cross head, for use in determining the adjustment of the crank pin for concave cherrying cuts.

The slide head 31, of the crank pin 21, confined in the cross head 20, carries a portion, such as plate 34, fitting and slidable along the outer or rear side of cross head 20, with the slide head 31. The top edge of this plate 34 is preferably substantially flush with the top face of cross head 20, that is provided with scales *a, b*. Said top edge of plate 34 is provided with visual index *c*, located and arranged for reading in connection with the radius length indications on the scales *a, b*. Thus, when the crank pin 21 is adjusted longitudinally of cross head or crank 20, to bring the index mark *c*, into registration with the zero mark common to both scales *a, b*, the axis of the crank pin will be in alinement with the axis of the rock shaft, and hence rotary movement of said shaft will then result in no movements of the work table and cutter spindle.

If it is desired to make cherrying cuts to produce a convex semi-cylindrical surface (see A, Fig. 2) of a certain radius, the nut or nuts 27 will be unscrewed to loosen washer 28, and certain bushings etc., on the crank pin 21, to render said crank pin free for adjustment by rotation of screw 32, if such be necessary. Thereupon, the crank pin will be adjusted by said screw to bring the index *c* into registration with the linear radius indicating mark on scale *a*, for the desired radius. The nut or nuts 27 will then be screwed up to lock the crank pin in such adjustment, or other means can be provided for locking the crank, if necessary or desirable.

If it is desired to make cherrying cuts to produce a concaved semi-cylindrical surface (see B, Fig. 2) the crank pin 21 will be adjusted from the common zero mark, along the scale *b*, until the index *c* registers with the linear number on said scale that corresponds to the desired radius. The crank pin will then be locked if locking in addition to the screw is desired.

In the particular example illustrated, the handle or crank 19 is swingable vertically to produce a complete cherrying cut, during which the table is released from all feed means other than the tracks 22, and the crank actuated slide 24, and the cutter spindle and tracer slide barrels are released from all feed and stop means other than the yoke 25 and crank actuated roller 23. On the completion of such stroke of the crank handle 19, to form a complete cherrying cut, the work table 4 is moved by the ordinary work table transverse feed means hereinbefore described, to carry the work transversely the distance required to receive the succeeding cherrying cut, and thereupon, the handle 19 is swung to its original position in readiness for swinging on another full stroke after the work has been moved by the table transverse feed the transverse distance equal to the width of the previously made cut.

In the example shown, a complete cherrying cut can be made by rocking the rock shaft 16, as by crank handle 19, through 180°, say from right to left from the righthand horizontal position, and the succeeding complete cherrying cut can be made (after feeding the work table 4, transversely the width of the cut to be made) by swinging said handle 19, back left to right to its original horizontal position, or by swinging the handle downwardly and upwardly in the same direction as when making said first cut, through 180° to complete the circle, by movement of the handle in the same direction throughout the two cuts.

Where desirable, particularly in heavy duty machine tools where comparatively large diameter cutters are employed to make heavy cuts, it is within the scope of our invention, to employ motor or other power actuated means to rock or rotate the rock shaft 16, in the production of cherrying cuts, either through power transmission to a crank, such as 19, or through gearing or the like direct to the rock shaft 16, from a suitable electric motor mounted for instance on the supporting or bracket arm 18. However, such specific power application is not shown in the drawings as such species is not specifically claimed herein, although broadly within the scope of the appended claims.

Where our instant invention is in form and arrangement adapting the same to the instant type of duplicating machine tool, the tracks or rails 22 are preferably removable from and applicable to the work table 4, and the supporting arm or structure 18, carrying the rock shaft and its crank, is also applicable to and removable from the machine frame or other part normally fixed thereto, and the yoke 25, and its supporting shank is also applicable to and removable from the tracer slide barrel. Such parts are rendered removable and applicable when employed in the instant machine, because such parts obstruct those portions of the table 4, and tracer spindle 9 and its chuck 10, that receive the pattern or copy and the tracer, when such instant machine is to be used for duplicating the copy in or on the work.

For instance, we show the rock-shaft-carrying bracket or structure 18, removably hung or supported from any suitably located machine frame or other normally fixed part, for example, the fixed elevated housing 15.

In this example, we show vertical plate 35, rigidly secured by bolts 36, to and in front of said rigid housing 15, and at its front side this plate 35 provides a vertical longitudinal dovetailed slideway 37.

The inner or rear vertical side of the upper end of the supporting arm 18 provides a vertical longitudinal dovetailed slideway 38, that is complementary to slideway 37 of fixed plate 35, and permits vertical adjustment of arm 18, thereon. The arm 18 is preferably provided with an exteriorly accessible clamping or set screw 39, by which the arm 18, can be locked to the plate 35, in the desired vertical adjustment. If so desired to attain easy and accurate vertical adjustment of supporting arm 18, on plate 39, the upper end of arm 18, can form a rearwardly directed rigid lip 40, overhanging the top of plate 35, and a rotary longitudinal vertical adjusting screw 41, can be threaded into a screw threaded socket in plate 35, with its upper end provided with hand or finger wheel 42, with said screw rotatably mounted in said lip 40, against relative longitudinal movement.

The attachment support 18 can be rendered removably attachable to the machine frame by any suitable means, although in the example illustrated, the attachment is removed by unscrewing and removing the several clamping screws or bolts 36, that secure plate 35, to the rigid machine frame part 15. The attachment 18, when thus released, can be removed from the machine tool, carrying the rock shaft 16, and its crank and crank pin which slips upwardly free of the rails 22, and which carries the yoke 25, previously released from the chuck or collet 10, of the tracer spindle. The rails 22, and the means carrying the same, are also removable from and applicable to the machine tool table or work holder, as hereinafter more fully described.

The attachment carrying or supporting member can be applied to the machine tool by dropping the slide block 24 into the space between rails 22, and inserting and securing the shank 26, in tracer collet 10, and clamping plate 35, rigidly to frame part 15, by bolts 36.

In the example shown, the rigid vertical rails 22 are arranged in a common vertical plane parallel with the longitudinal axis of the work table 4, when operatively located on said table. The rails upstand from and are fixedly secured to or otherwise are rigid with a horizontal supporting foot or member 43, and this member 43 is carried by and confined to a base 44, adapted to rest on the top portion of table 4, to which the copy is normally clamped, and be removably and rigidly secured to said table 4, by removable bolts and nuts 45.

The plate member 43, and the rails 22, rigid therewith, are preferably confined to base 44, against relative vertical movements, and against relative lateral movements that are longitudinally of table 4, in such manner as to permit relative straight line movements that are transversely with respect to the longitudinal axis of said work table. This relative transverse movability between base 44, and member 43, permits transverse feeding of the table 4, and base 44, before beginning each cherrying cut, without disturbing the transverse position of member 43, and rails 22, with respect to the rock shaft and its crank, and the tracer barrel. If so desired, the member 43 can be thus mounted on the base 44, through the medium of rows of balls 46.

The example vertical cutter spindle machine, illustrated is a multi-purpose milling, die sinking, duplicator, or other machine, when the cherrying mechanism parts are operatively disconnected.

Certain parts of this illustrated example machine (for example, the vertical cutter spindle 6, and the work holder 4) are organized to produce simultaneous vertical and horizontal relative movements for the production of cherrying cuts in the work on the holder by the operation of the cutter carried by said spindle under the propulsion and control of the cherrying mechanism when operatively coupled into said machine by connection with the appropriate moving part or parts thereof.

The example cherrying mechanism disclosed, provides a supporting fixture, for example, part 17, 18, 41, whether fixedly or detachably applied to a normally-fixed machine part; and also provides a vertical movement propelling fixture, for example part 25, 26, whether detachably or fixedly coupled with a moving part of the machine for producing the vertical linear relative movements between the cutter spindle and the work; and also provides a horizontal linear movement propelling fixture, for example, parts 22, 43, 44, whether detachably or fixedly coupled with an appropriate machine movable part, for example, work holder 4, for simultaneously propelling the same on relative horizontal linear movements.

In the example cherrying mechanism disclosed, a driven primary rotary member, for example part 16, etc., propels the machine parts on their simultaneous vertical and horizontal relative movements through the medium of substantially-straight line propelling transmissions, one of which includes, for example fixture 25, and converts the vertical components of said driven member into vertical linear movements, while the other transmission includes, for example, fixture 22, etc., and converts the horizontal components of the rotary movements of said driven member, into horizontal linear movements.

Where the organization of the instant invention is employed, the time and expense involved in making a master or copy for each size or piece of work to be produced, is avoided, and this saving becomes of greater value, where a number of work pieces of various sizes, each involving a semi-cylindrical or other surface requiring cherrying cuts, are required, with only one piece of each size or shape to be cut. In the example disclosed of an embodiment of the invention, the adjustments for production of work of the desired radius, can be easily and quickly made, and the cherrying cutting operations are quickly and easily carried out through one hand manipulation, in this example, of the crank handle 19.

Cherrying or substantially like work of 180° in a vertical plane can be produced by the particular example disclosed, either concave or convex, by swinging lever 19, upwardly from either right to left or left to right through 180°, or downwardly from either right to left or left to right through 180°. When making concave cuts in a vertical plane, of 180° the lever 19 can be swung in either direction through 360°.

As various modifications, changes, adaptations, and substitutions, can be made without departing from the spirit and scope of the instant invention as defined by the following claims, we wish it understood that the disclosure hereof is merely illustrative for purposes of explanation, and is not made for purposes of limitation except where so imposed by the prior art.

What we claim is:

1. In a machine tool, in combination, a vertical rotary cutter spindle movable vertically and normally fixed against lateral movements; a work holder table operatively associated with said spindle and horizontally movable; a normally fixedly located rotary member provided with means for rotating the same, means actuated by rotary movements of said member for propelling said cutter spindle on its vertical movements, and means actuated by said rotary movements of said member for simultaneously propelling said table on its horizontal movements.

2. In a machine tool, the combination of a vertical rotary cutter spindle; means whereby said spindle is rendered longitudinally movable in a vertical straight line and normally held against lateral movement; a work table operatively arranged below said spindle; and means rendering said table movable horizontally in a straight line; with a cherrying mechanism operatively connected with both said cutter spindle and said table to simultaneously propel said spindle on its straight line vertical movement and said table on its straight line horizontal movement for the production of a cherrying cut in the work, said mechanism including a normally fixedly located rotary actuating member provided with a manual controlling and operating handle.

3. In a machine tool, the combination of a vertical rotary cutter spindle; means whereby said spindle is rendered longitudinally movable in a vertical straight line and normally held against lateral movement; a work table operatively arranged below said spindle; and means rendering said table movable horizontally in a straight line; with a cherrying mechanism operatively connected with both said cutter spindle and said table to simultaneously propel said spindle on its straight line vertical movement and said table on its straight line horizontal movement for the production of a cherrying cut in the work, said mechanism including a crank rotatable on a normally fixedly located axial line, provided with means for rotating the same on said axis, said crank provided with an eccentric member normally fixed thereto at a predetermined radial distance from said axis, and means whereby said member can be adjusted and set to vary the eccentricity thereof, to predetermine the radius of the cherrying cut.

4. In a machine tool, a work holding table laterally movable in a straight line; and a vertical cutter spindle adapted to carry a cutter in operative association with work held by said table, said cutter spindle being movable longitudinally and normally held against lateral movements, in combination with cherrying mechanism controlling said movements of said spindle and said table for simultaneously propelling said spindle longitudinally and said table laterally in the production of cherrying cuts, said mechanism being operatively connected with both said spindle and said table, and comprising actuating means, and movement transmissions therefrom to said table and to said spindle.

5. In a machine tool; a vertical cutter spindle movable longitudinally and normally held against lateral movement; and a work holding table arranged below said spindle, and normally confined to straight line horizontal movements; in combination with an eccentric member rotatable around a normally-fixedly located horizontal axial line, controlling and actuating means for thus rotating said eccentric member, means for adjusting and setting said eccentric member to increase or decrease the radial eccentricity of said member, rotary movement transmitting and converting means actuated by and operatively connecting said member with said spindle to actuate said spindle on its straight line movements; and rotary movement transmitting and converting means actuated by and operatively connecting said member with said table to simultaneously actuate said table on its straight line movements.

6. In a machine tool, a work holding table movable horizontally; and a vertical cutter spindle movable longitudinally toward and from said table, in combination with cherrying mechanism including an actuating member rotatable on a normally fixedly located axial line and provided with rotating means, said actuating member provided with crank means and a crank pin, means for propelling said table on its horizontal movements embodying spaced upright rails carried by said table with said crank pin confined and vertically movable therebetween; and means also operatively associated with said crank pin and actuated by the arcuate movements thereof and operatively associated with said spindle for propelling the same on its longitudinal movements.

7. In a machine tool, a work holding table movable horizontally; and a vertical cutter spindle movable longitudinally toward and from said table, in combination with cherrying mechanism including an actuating member provided with an eccentric device set at a predetermined radius, and rotatable on a normally fixedly located axial line and provided with rotating means, means operatively associated with said device and actuated by the arcuate movements thereof and operatively associated with said table to propel the same on its horizontal movements, and means also operatively associated with and actuated by said arcuate movements of said device and operatively associated with said cutter spindle for simultaneously propelling the same on its longitudinal movements, said last named means including vertically movable spaced connected horizontal tracks with said device arranged therebetween to raise and lower said tracks as said device moves up and down in its arcuate path.

8. In a machine tool, a work holding table horizontally movable; a longitudinally movable vertical cutter spindle; a longitudinally movable vertical tracer spindle, and means operatively connecting said spindles to move longitudinally together; in combination with cherrying mechanism that includes a normally fixedly located supporting frame or bracket, an actuating member carried by said bracket and rotatable on a normally fixedly located horizontally disposed axis, means for rotating said member, and eccentric and motion converting movement transmitting connections actuated by and extending from said rotary member to said table and to said tracer spindle, for simultaneously propelling said table on its horizontal linear movements and said cutter spindle on its longitudinal linear movements by the rotary movements of said member.

9. A cherrying attachment for a machine tool having a work holding table movable horizontally, and a vertical longitudinally movable cutter spindle, said attachment including a supporting bracket for securing to a fixed part of said machine, a single rotary actuating member carried by said bracket and mounted for rotation on a substantially horizontal axial line and provided with operating means, said rotary member provided with a crank and a crank pin adjustable to predetermine the radius of the cherrying cut, said pin adapted for association with means for propelling the table on its said horizontal movements, and also for association with means for simultaneously propelling said spindle on its longitudinal movements.

10. A cherrying attachment for a machine tool having a work holding table movable horizontally, a vertical longitudinally movable cutter spindle, and a vertical longitudinally movable tracer spindle, said spindles geared together to simultaneously move longitudinally in the same directions; said attachment comprising a supporting bracket for securing the same to a normally fixed part of said machine, a rotary actuating member carried by said bracket and provided with a crank arm, and eccentrically arranged crank pin, adapted for operative association with means carried by said table for propelling the table on its horizontal movements, and a yoke adapted for securing to said tracer spindle, with said crank pin operatively arranged in said yoke to propel said spindle on its longitudinal movements by rotary movements of said member.

11. A cherrying mechanism as an accessory in or for a vertical cutter spindle machine that includes a vertically movable cutter spindle normally held against lateral movements and a work holder, organized for simultaneous vertical and horizontal relative movements between said spindle and said holder; said mechanism comprising a supporting member for attachment to a normally fixed part of said machine apart from said spindle and said holder, a rotary eccentric device mounted to said member for rotation on a normally fixedly located axis; actuating means for rotating said device through approximately 360°; vertical movement transmission means actuated by said device for converting the vertical component of the rotary motion of said device into linear movements, for operative coupling with the appropriate movable parts of said machine to produce said relative vertical linear movements; horizontal movement transmission means actuated by the rotary motion of said device for simultaneously converting the horizontal component of said rotary motion thereof into corresponding linear movements, for operative coupling with the appropriate movable parts of said machine to simultaneously produce said relative horizontal movements.

12. An accessory for a vertical cutter spindle machine that includes a vertical cutter spindle, and a cooperating work holder, organized for relative vertical movements between the cutter and the work controlling the operative depth of the cutting association between the cutter and the work, and for relative simultaneous horizontal movements between the cutter and the work controlling the lateral operative cutting association of the cutter and work; said accessory comprising a supporting bracket for securing to a normally-fixed part of said machine, an eccentric actuating member of predetermined radius mounted to said bracket for relative rotation on a horizontal axis and provided with operating means; and movement transmissions for simultaneously converting the vertical and horizontal components of the rotary motions of said member into corresponding vertical and horizontal linear movements, one of said transmissions adapted to be operatively coupled with said cutter spindle, and the other adapted to be operatively coupled with said work holder, for the production of cherrying cuts in the work.

13. A cherrying accessory for operative detachable assembly with a vertical cutter spindle machine wherein the work holder and the cutter spindle are organized for relative vertical and horizontal movements for the production of cherrying cuts in the work; said accessory comprising a supporting bracket for securing to a part of said machine, a member mounted to said bracket for relative rotation, said member provided with a crank arm for rotating the same, rotary eccentric means of a predetermined radius actuated by said member, and several actuating transmissions from and driven by the rotation of the said eccentric member for operative detachable coupling with said work holder to produce said relative vertical movements between said spindle and said holder and for operative detachable coupling to simultaneously produce said relative horizontal movements between said spindle and said holder, respectively, all by the rotation of the said member.

14. A cherrying accessory in or for a vertical cutter spindle machine wherein means are provided for raising and lowering said spindle while said spindle is maintained against lateral movements, and wherein the work holder and spindle are organized for relative horizontal movements; said accessory comprising a supporting member for removably securing to a machine part independently of said spindle and said work holder, rotary eccentric operating means of a predetermined radius mounted to said supporting member and provided with an actuating device, a movement transmission actuated by the rotation of said eccentric means for converting the rotary movements thereof into vertical linear movement, said transmission including means for detachably coupling with said means for raising and lowering said spindle for actuating the same on its vertical movements, and a movement transmission simultaneously actuated by the rotation of said eccentric device for detachable coupling with said work holder for producing said relative horizontal linear movements between said spindle and said holder, in the production of cherrying cuts in the work by the cutter of said spindle.

15. A cherrying accessory in or for operative assembly with a vertical cutter spindle machine wherein the work holder and cutter spindle are organized for relative vertical and relative horizontal movements between said spindle and said holder while said spindle is normally held against lateral movements, for the production of cherrying cuts in the work, said accessory comprising a supporting bracket provided with vertical adjustment means for attaching the same to a machine part, rotary eccentric means of predetermined radius mounted to said bracket, and a movement transmission actuated by the rotation of said eccentric means for converting the rotary movements thereof into said relative horizontal movements between said spindle and said work holder, said transmission including a fixture for securing to the work holder, for cooperating with said rotating eccentric to convert the horizontal component thereof only into horizontal linear propulsion of said holder.

16. A cherrying accessory in or for a vertical cutter spindle machine wherein the work holder means and the cutter spindle means are organized for simultaneous relative vertical and horizontal linear movements for the production of cherrying cuts in the work; said accessory including a supporting member, a rotary member mounted to said member and provided with an eccentric device of predetermined radius, operating means for rotating said member and its eccentric device, a fixture for operative connection with said spindle to produce said relative vertical linear movements, said last named fixture being constructed to cooperate with said rotating eccentric device and convert the vertical components of its rotary movements into linear vertical movements of said spindle, and another fixture for coupling with the appropriate means to produce said relative horizontal linear movements, said just mentioned fixture being of construction to simultaneously cooperate with said rotating eccentric device and convert the horizontal components of said rotary movements into linear horizontal movements of said work holder.

17. A cherrying accessory for a vertical cutter spindle machine wherein the cutter spindle is movable vertically and the work holder simultaneously movable horizontally for production of cherrying cuts in the work, said accessory comprising a supporting member for securing to said machine in a normally fixed position, said member provided with driven rotary eccentric means, and transmissions operated by said eccentric means for operative assembly with parts of said machine for simultaneously producing said vertical and horizontal movements, one of said transmissions including a base for securing to said work holder, a fixture mounted on said base for propelling said base and the holder on straight line horizontal movements, said base being relatively movable with respect to said fixture transversely of said straight line movement, said fixture being formed for propulsion by and operative association with said rotary eccentric means to convert the horizontal component only of the eccentric means rotation into said straight line linear movements of said holder.

18. A cherrying accessory in or for a vertical cutter spindle machine wherein said spindle and the work holder are organized for simultaneous relative horizontal and vertical movements for the production of cherrying cuts in the work; said accessory comprising a support, a member mounted thereto for rotation on a horizontal axial line normally fixedly located, means for rotating said member, said member including a rotary cross head crank arranged diametrically of said axial line, eccentric means settable longitudinally along either radius arm of said cross head to predetermine the radius and convexity or concavity of the cherrying cut; and transmissions operatively associated with and actuated by said eccentric means for operative association with said spindle and said work holder to produce said simultaneous relative vertical and horizontal movements.

19. In a vertical cutter spindle machine wherein the work holder and said spindle are capable of simultaneous vertical and horizontal relative movements for producing cherrying cuts; cherrying mechanism comprising a member rotatable on a substantially horizontal axial line and provided with oppositely projecting radial cranks, eccentric means settable longitudinally of said cranks to predetermine the radius and convexity or concavity of the cherrying cut; and transmissions operatively associated with said eccentric means and associated with said spindle and work holder to simultaneously propel the same on said relative vertical and horizontal movements.

20. In a vertical cutter spindle machine having a work holder movable horizontally in a straight line and feedable transversely with respect to said straight line, said machine being organized for simultaneous vertical and horizontal movements between said spindle and holder for the production of cherrying cuts; cherrying mechanism comprising independently mounted rotary propelling means provided with actuating means, a transmission actuated by the vertical component of the rotary movements of said propelling means and coupled to produce said relative vertical movements, and a transmission simultaneously actuated by the horizontal components of the rotary movements of said propelling means and coupled to propel said work holder on its said straight line movements, said last named transmission including a fixture applied to said holder to propel the same on said straight line movements, said holder being relatively feedable transversely with respect to said fixture.

21. In a machine tool having a vertical cutter spindle normally held against lateral movements, and a work holder, organized for simultaneous vertical and horizontal coordinated relative movements for the production of cherrying cuts; cherrying mechanism comprising an independently mounted propelling member rotatable on a substantially horizontal normally-fixedly located axial line, and provided with actuating means, and movement transmissions coupled to produce said simultaneous vertical and horizontal coordinated relative movements, one of said transmissions actuated by the vertical components of the rotary movements of said propelling member to transmit vertical linear movements, and the other transmission simultaneously actuated by horizontal components of the rotary movements of said propelling member to simultaneously transmit horizontal linear movements to said holder.

PETER M. HENKES.
FRED STEINBRECKER.